April 17, 1962
J. R. WIRT
3,030,493
METHOD OF WELDING
Filed Nov. 23, 1959
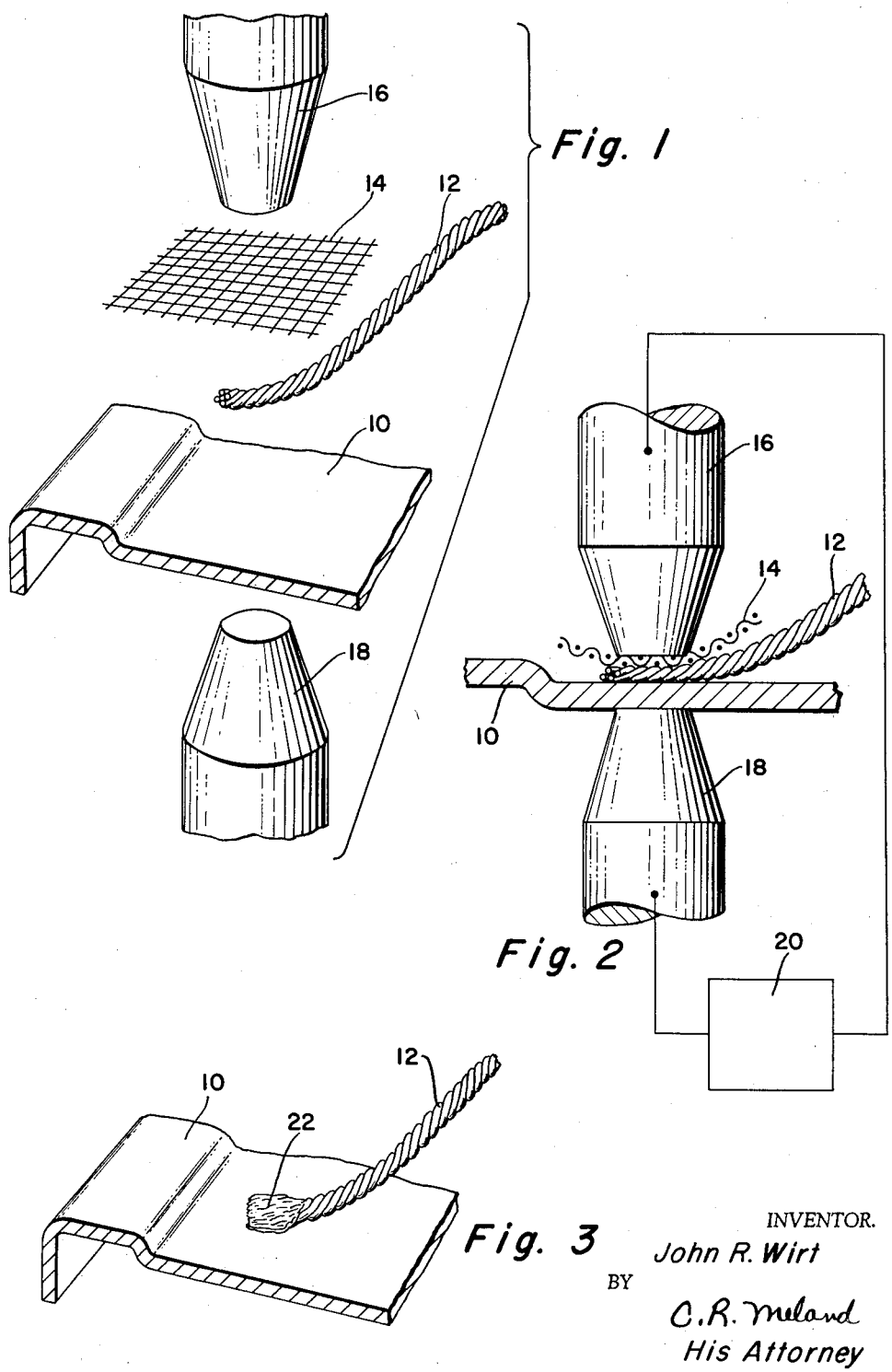
INVENTOR.
John R. Wirt
BY
C.R. Meland
His Attorney

United States Patent Office 3,030,493
Patented Apr. 17, 1962

3,030,493
METHOD OF WELDING
John R. Wirt, Anderson, Ind., assignor to General Motors Corporation, Detroit, Mich., a corporation of Delaware
Filed Nov. 23, 1959, Ser. No. 854,676
4 Claims. (Cl. 219—92)

This invention relates to a method of welding a lead wire of small diameter to a metal plate to provide an electrical connection therebetween.

In the manufacture of electrical equipment such as the regulator of a motor vehicle electrical system, it is frequently required to weld a small diameter conductor to a metal base to provide an electrical connection therebetween. In the specific case of a regulator, it is required at times to weld a small coil winding lead, which is formed of copper, directly to the base of the regulator which may be a zinc-plated steel.

In performing the operation by a resistance welding method, one electrode of the welder engages the regulator base while the other electrode directly engages the lead wire to force it into contact with the regulator base. It has been found that the pressure exerted by the one electrode on the copper wire tends to flatten and thin out the wire resulting in a fragile weld.

It has been suggested in the patent to English 2,329,343 that the subject method of welding could be improved by placing a solid piece of metal over a wire conductor and then serially passing a welding current through the solid metal piece, the wire conductor and the conductor plate to which the wire conductor is to be welded.

In contrast to the method disclosed in the English patent, it is an object of this invention to provide a method of welding a small diameter lead wire to a metal base by placing a quantity of metal gauze or metal screen-like material between one of the welding electrodes and the lead wire thus preventing flattening out of the lead wire during the welding operation. This method is superior to the use of a solid metal piece in that less welding current is required and less material is used in making the weld. In addition, the metal gauze forms a natural welding projection and is easier to transfer when using vacuum transfer devices.

Another object of this invention is to provide a welded joint which includes a metal base member, a small diameter wire and a quantity of gauze material which is fused to the conductor and forms a part of the weld.

Further objects and advantages of the present invention will be apparent from the following description, reference being had to the accompanying drawings wherein preferred embodiments of the present invention are clearly shown.

In the drawings:

FIGURE 1 is a view showing the positioning of the metal base, lead wire and metal gauze prior to performing a welding operation in accordance with this invention.

FIGURE 2 is a view illustrating a welding operation performed in accordance with this invention.

FIGURE 3 is a view illustrating a metal conductor welded to a metal base, the weld being made in accordance with this invention.

Referring now to the drawings, the reference numeral 10 designates a metal base member which may be the base of a regulator used in motor vehicle electrical systems. The base is formed of metal material and in the case of a regulator is formed of zinc-plated steel. The reference numeral 12 has been used to indicate a copper lead wire of relatively small diameter which is to be welded to the metal base 10. In the case of a motor vehicle regulator, the lead wire 12 may be connected to a coil winding of one of the relay units. The lead wire 12 is of the stranded type and may have a diameter in the order of magnitude of a lamp filament.

In welding the lead wire 12 to the base 10, a small section of metal gauze material designated by reference numeral 14 is provided which is positioned between the lead wire 12 and one of the welding electrodes 16. The other welding electrode is designated by reference numeral 18 and this electrode engages the base member 10. The metal gauze 14 may be formed of either brass or copper and is formed of interwoven strands of this material as is apparent from FIGURE 1.

When it is desired to perform the welding operation of this invention, the metal base 10, copper wire 12, and metal gauze 14 are positioned between welding electrodes 16 and 18 in a manner illustrated in FIGURE 2. The welding electrodes are connected with a suitable source of welding current designated by reference numeral 20. With the parts positioned as illustrated in FIGURE 2, pressure is applied to the stacked assembly and welding current is passed between the electrodes 16 and 18 to cause the copper wire 12 and metal gauze 14 to be fused to the metal base 10. In performing this welding operation, the metal gauze 14 prevents the copper wire 12 from being flattened out to the extent that a fragile weld might result. The metal gauze 14 also forms a natural welding projection and becomes embedded or fused to the copper wire 12 and to the base 10 during the welding operation.

The final welded position of the parts is illustrated in FIGURE 3 wherein the copper wire 12 is shown welded to the base member 10 at point 22, the point 22 representing the fusion of the copper wire 12 and metal gauze material 14 to the base member 10. It will, of course, be appreciated that some of the metal gauze 14 will be only fused to the copper wire 12 while other portions of it will be fused to the base member 10.

While the embodiments of the invention as herein disclosed constitute preferred forms, it is to be understood that other forms might be adopted.

What is claimed is as follows:

1. A method of welding a small diameter lead wire to a sheet metal base, the steps comprising, positioning the lead wire on the base, placing a section of metal gauze-like material over the lead wire, and then passing a welding current serially through the gauze-like material, lead wire and metal base.

2. A method of electrically welding a small diameter lead wire to a relatively large sheet metal base, the steps comprising, providing a stacked assembly including the metal base, the lead wire and a section of metal gauze with the lead wire being positioned between the metal base and the gauze, and then passing a welding current serially through said metal gauze, said lead wire and said metal base.

3. A method of welding a lead wire of small diameter to a relatively large sheet metal base, the steps comprising, placing the lead wire on said metal base, placing a section of metal gauze over said lead wire, and then applying pressure to said lead wire through said metal gauze while substantially simultaneously passing a welding current through said metal gauze, lead wire and metal base.

4. A method of welding a lead wire of small diameter to a relatively large sheet metal base, the steps comprising, placing the lead wire on said metal base, placing a section of metal gauze-like material over said lead wire, bringing a first welding electrode into contact with said gauze-like material and another welding electrode into contact with said metal base, and then passing a welding current between said electrodes and through said metal gauze, said lead wire and metal base.

References Cited in the file of this patent

UNITED STATES PATENTS

| | | |
|---|---|---|
| 2,262,455 | Goodloe | Nov. 11, 1941 |
| 2,343,998 | Powell | Mar. 14, 1944 |